April 9, 1957 R. GIRERD 2,788,516
CAPACITATIVE TYPE MEASURING SYSTEM
Filed May 13, 1952 2 Sheets-Sheet 1

Inventor
Robert Girerd
By Ralph B. Stewart
attorney

April 9, 1957 R. GIRERD 2,788,516
CAPACITATIVE TYPE MEASURING SYSTEM
Filed May 13, 1952 2 Sheets-Sheet 2

United States Patent Office 2,788,516
Patented Apr. 9, 1957

2,788,516

CAPACITATIVE TYPE MEASURING SYSTEM

Robert Girerd, Paris, France

Application May 13, 1952, Serial No. 287,651

Claims priority, application France May 18, 1951

8 Claims. (Cl. 340—201)

The present invention relates to devices for indicating and/or measuring the variations in any physical quantity which mechanically, thermically and/or electrically develops into a pick-up element to which it is applied, a mechanical stress translated into a departure of a wall of said element from a reference plane position.

The invention is mainly concerned with devices for the indication and/or measurement of the departures of a wall from a mean plane position of reference, whatever the cause of such departures may be.

It is further more particularly concerned with devices which are specially fitted for indicating very small values of departure or displacement of a wall from a reference plane position.

According to the invention, such a device comprises a first condenser electrode attached to said wall, a second condenser electrode of fixed position in a reference plane, means for charging said condenser from a D. C. voltage supply, means for periodically discharging said condenser and means for collecting the discharge voltages for the actuation of a voltage indicator. One of said condenser electrodes is connected to a voltage supply battery and a switch periodically closes the discharge circuit of the condenser from the other condenser electrode to a grounded resistor across which the discharge voltages are picked up.

According to another feature of the invention, said switch comprises a photoelectric (photoconducting) cell which is periodically energised by a light beam; said photocell being preferably formed upon one of the condenser electrodes by the deposition of at least a photo-conductive layer onto said electrode.

The invention will be more fully described with reference to the attached drawings, wherein.

Figure 1:
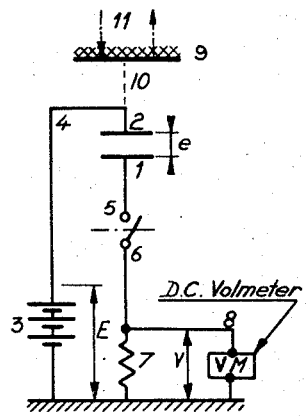
Fig. 1 shows the basic circuit diagram of a device according to the invention.

Referring first to Fig. 1, two condenser electrodes are shown at 1 and 2. The voltage from a battery 3, or other D. C. voltage supply of constant voltage, is applied to the electrode 2 through the conductor 4. The electrode 1 is connected to the terminal 5 of a unipolar switch, the other terminal of which is grounded through a resistor 7. An output conductor is indicated at 8, for supplying the discharge voltages from the condenser 1—2, upon repeated closing of the switch 5—6, to an indicating apparatus (not shown). It is apparent that, during the time intervals wherein the switch is open, the electric condenser has its electrode 1 insulated from the ground. When said switch is closed, the charge on the condenser electrodes will be proportional to the voltage E of the battery 3 and to its own capacity, which latter is proportional to the distance e between its electrodes for a given dielectric material (e. g. air) and given areas of the said electrodes; the electric charge of the condenser flows through the load resistor 7 and a voltage difference across said resistor appears, which is a measure of the electric charge of said condenser. By the conductor 8, said voltage may be applied to any voltage meter VM, for instance a peak voltmeter the voltage indication of which gives a measurement of the value of the capacity of the condenser 1—2.

Further, if the relative position of the wall 9, hence of the electrode 2, with respect to the fixed plane position of the electrode 1, varies during a time interval wherein the switch is closed, for instance under the action of a vibration of a short period with respect to said time interval, the peak voltage appearing on the conductor 8 will be modulated by said vibration and the degree of modulation will depend upon the amplitude of said vibration of the wall 9 with respect to its mean plane position.

A periodical control of the condition of the switch will enable the indication and/or measurement of any departure of the wall 9 from its mean plane position, even if such a departure has a very small amplitude. Upon periodically opening and closing the switch 5—6, current impulses are obtained in the load resistor 8, each impulse corresponding to a small portion of the beginning of the discharge curve of the condenser upon which is superimposed a variation of voltage due to the variation of capacity of the condenser subjected to vibration or change of position. If the vibration be of a random or pulsating character varying in either one of the directions indicated by the arrow 11, the peak value of the discharge voltage, as well as its average value, is changed; if the vibration be of an oscillatory character, the peak value only of the voltage will be modified and it is thus possible to obtain indication and/or measurement of any departure of the wall from its mean position. The mechanical link 10 apparently might be a demultiplying one but such a linking arrangement will generally be superfluous and, on the other hand, it is preferred to restrict such a link to a minimum length, for instance by deposition of a metallic layer upon the wall 9 itself, if said wall is not of a conductive material, and, if said wall is conductive, its face will constitute the very electrode 2 of the condenser.

It is clear that said wall 9 can be the end wall of an element picking up a physical phenomenon which may be of any kind provided it can act upon such a pick-up element for producing a displacement of said wall as a result of an internally developed stress, said displacement being related to the intensity of the concerned physical action. Illustratively, the wall 9 may be constituted by a diaphragm included in the rigid wall of a container the contents of which, either liquid or gaseous, is submitted to a mechanical stress, either of a continuous or of a pulsatory (and even oscillatory) character. Illustratively also, said wall 9 may be the end face of a rod adjusted to vibrate at the resonance condition of an elastic wave. Also, and illustratively again, said wall 9 may be an end face of a piezoelectric element, of a magnetostrictive element, of a thermo-expandable element, and the like.

For ensuring a satisfactory permanence of the indication, however, it is desirable to provide for a quick acting and quickly keyable switch; the useful time intervals for the charge and the discharge of the condenser 1—2 can be made very small.

Figure 2:
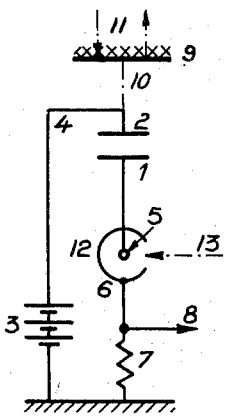
Fig. 2 shows an illustrative embodiment according to the diagram of Fig. 1.

According to a particular feature of the invention, said switch, in Fig. 2, is formed as a photoelectric cell 12, the conductibility of which is controlled at the desired frequency or keying rate by means of a light beam 13. A photocell has no delay of response to such a light control, which may be ensured at any rate, for instance by means of a shutter masking and unmasking a light, or else and preferably by means of the light spot formed upon a phosphorescent or luminescent screen of a cathode ray tube having its cathode ray electrically keyed at the desired rate.

The discharge voltage will be amplified as usual before supplying it to a voltage indicator.

Now, if the driving action of the wall 9 is a fluctuating or an oscillating one, said wall oscillates with respect to a mean plane position, and it is apparent that the discharge voltage will only represent that developed by the condenser charge during a single half-wave of the said action which charges the condenser 1—2 during the time intervals wherein the photocell 12 is non-conductive. In order to increase the sensitiveness of the device, it is further proposed, according to another feature of the invention, to obtain a cumulative storage of energy by means of a half-wave or a full-wave rectification of the alternating charge of the condenser.

Figure 3:
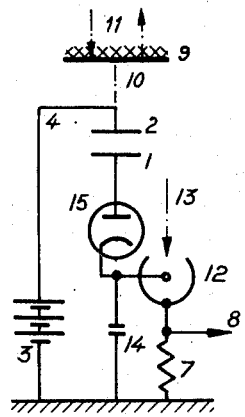
Figs. 3 and 4 show two alternative embodiments, which are to be preferred when the wall is movable to either side of a mean plane position of reference with an oscillating motion.
Figure 4:
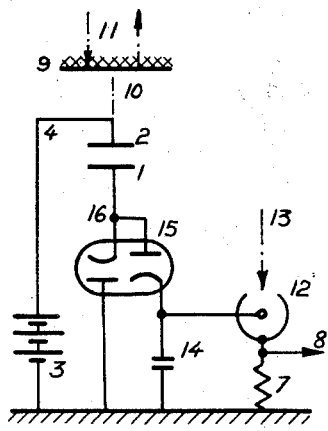

Such a cumulative storage of electric energy is obtained by the provision of a storage condenser 14, to the ground, which is charged through the half-wave rectifier 15, Fig. 3, or through the full-wave rectifier 15—16, Fig. 4. The network constituted by the photocell 12 and its load resistor 7 is connected in shunt across said condenser 14, itself connected between the cathode of the rectifier 15 and the ground; the rectifier 16, Fig. 4, has its plate connected to the ground.

The cumulative storage of electric charges by said condenser 14 may be easily understood: for the circuit shown in Fig. 3, for each positive half-wave of the voltage between the condenser electrodes 1 and 2, resulting from the action of a half-wave of the driving oscillation of the wall 9, the voltage charge taken by said condenser 1—2 is transmitted through the half-wave rectifier 15 to the condenser 14 which stores it. During a time interval between closures of the switch, between two consecutive applications of the control light beam 13, the condenser 14 cumulatively stores individual charges, each of a value which may be denoted $q_1$ and thus takes the overall charge $q_1.n$ where $n$ is the number wave periods of the driving oscillation occurring during such time interval. Each of the charges $q_1$ has an elementary value which depends upon the amplitude of displacement of the condenser electrode 2, related to the intensity of the driving phenomenon.

During the discharge time interval, the photocell 12 is lighted and rendered conductive, the condenser 14 will be discharged through said photocell which transfers an electric current $n$ times higher than the current which would have been present if said condenser 14 were omitted. The capacity of said condenser 14 is so taken as to enable the cumulative storage of $nQ$ electric elementary charges, Q being the maximum value of charge of the condenser 1—2 for a maximum alternate departure of the wall 9 from its mean plane position.

The half-wave rectifier 15 plays the same part in the circuit shown in Fig. 4 as in Fig. 3 but, in addition to the charges said rectifier 15 transfers to said condenser 14, for the half-waves of one polarity of the oscillating drive, the rectifier 16 will also transfer elementary charges to the condenser 14 during the half-waves of the reverse polarity. These latter charges will, however, be smaller than the charges transferred through the rectifier 15.

According to a further feature of the invention, the photocell 12 is formed upon one of the condenser electrodes 1—2. In the above-described circuits, it will be formed upon the electrode 1, but it can also be formed upon the electrode 2 with a change-over of the connections of the battery and output circuit to said condenser electrodes.

Figure 5:
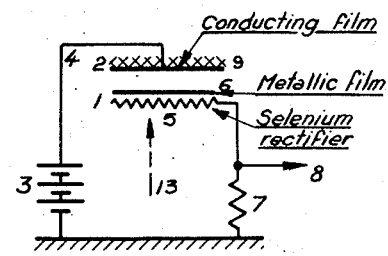
Figs. 5 to 7 show three preferred embodiments of the device, respectively in accordance with the Figs. 2 to 4.

Fig. 5 shows an embodiment of such a kind which corresponds to the circuit diagram shown in Fig. 2. The condenser electrode 1 is constituted by a metallic conducting sheet or plate, aluminium or iron for instance, and on the face of said sheet receiving the control light beam 13, a photoconductive layer such as a selenium layer is applied. The output load resistor 7 is connected from said selenium layer to the ground. When the selenium layer is unilluminated, the resistance from 6 to 7 through the said layer is very high and practically no current flows through the resistor 7. On the other hand, when the selenium layer is illuminated, its internal resistance suddenly drops. Then the current variations will be fully transmitted through the resistor 7. Actually, this photoconductive switch acts as a result of a change from a high to a low series resistor in the load circuit. If the condenser electrode 1 has a dielectric base plate, a layer of aluminium is formed on said plate before the application of the selenium layer. Naturally, copper and copper oxide can be used instead of iron (or aluminium) and selenium layers.

Figure 6:
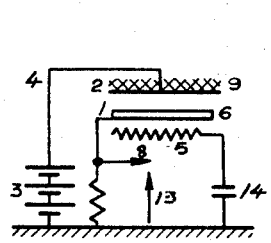

In Fig. 5, the metallic base plate bears the reference figure 6 and the selenium layer the reference figure 5, in correspondence of circuit diagram in Fig. 2.

According to another feature of the invention, it is also provided to form the rectifiers 15 and 16 onto the condenser electrode, in a quite similar way as for the constitution of the photocell 12. Further, said photocell will play the very part of the rectifier 15, as shown in Fig. 6, when the storage condenser 14 is connected to the selenium layer 5. Fig. 6 corresponds to the circuit diagram of Fig. 3. The positive pulses of alternations of the signal from the plate 2 will charge cumulatively the condenser 14 and the charge acquired by said condenser will act as a fluctuating bias voltage modifying the point of operation of the photoconductive cell in accordance with the fluctuations. But each time the photocell is illuminated, the direction of the current through the circuit 14—5—6—7 will be opposite to the direction of the current which, passing through the photocell 6—5, charges the condenser 14.

Figure 7:
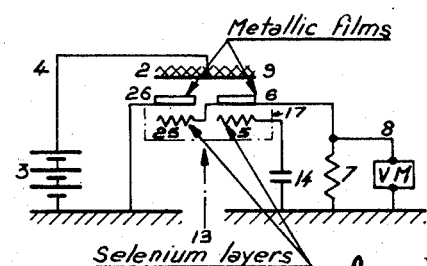

Fig. 7 shows an embodiment combining the photocell and the two half-wave rectifiers in accordance with the circuit diagram shown in Fig. 4. The photoconductive layer 25 is galvanically connected to the metallic layer 6, and the metallic layer 26 is connected to the ground. These layers are formed in or upon a transparent insulating base plate, for instance by the so-called "printed circuit" technics. If wanted, the condenser 14 and resistor 7 can also be formed upon said transparent base plate by the same technics, so that a component unit be obtained, of very small volume and very high mechanical strength. Such a component unit appears to be of particular advantage when the other condenser electrode 2 is carried by or constitutes the end face of a resonant rod supported by one of its nodal point, as said supporting part can bear the complete structure of the device. The operation is the same as in Fig. 4, viz. the part 25—26 of the unit will act as a D. C. restorer for the charge acquired by condenser 14; the other part of said unit operates as aforesaid for the arrangement of Fig. 6.

For each embodiment wherein is provided a storage condenser, the following may be stated: Considering the storage condenser 14 without any charge thereon, the first positive pulsation or alternation of the signal will charge the said condenser, of capacity C1 (C denoting the capacity of the variable condenser 1—2), to a potential:

$$v_1 = E \cdot \frac{C}{C+C1} = k.E$$

The second positive pulsation or alternation will charge again the condenser 14 by an additional amount, and the potential of said condenser becomes:

$$v_2 = (E - v_1).k + v_1$$

The third positive pulsation or alternation will similarly increase the potential difference across 14:

$$v_3 = k.(E - (v_1 + v_2)) + v_1 + v_2 = k.E.(1-k)^2 + v_1 + v_2$$

and the $n$th positive pulsation or alternation will increase the potential difference across 14 by an amount of:

$$k.E(1-k)^{n-1}$$

There results a cumulative action and an important increase of the sensitivity of the device.

Figure 8:
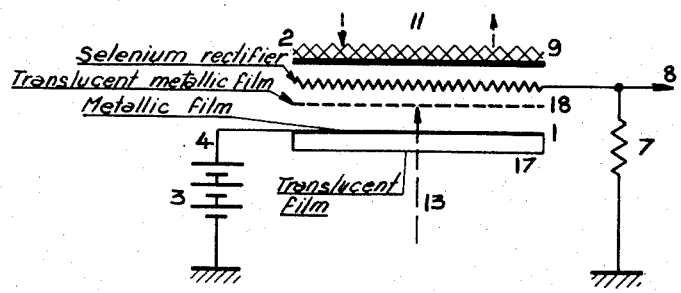
Fig. 8 shows an alternative embodiment to the one in Fig. 5.

In the embodiment shown in Fig. 8, of a circuit diagram reverted with respect to that of the embodiment shown in Fig. 5, the condenser electrode 1 consists of a semi-transparent film (aluminium, silver) applied upon a transparent supporting plate 17. The condenser electrode 2, when the rod 9 is not in a conductive material, is formed on the wall 9 (iron, aluminium and alloys, copper) as a film deposit. Upon said condenser electrode 2 is applied the photoconductive layer or film 5 (selenium, copper oxide). When requested, a thin translucid layer 18, of a conductive material, may be formed upon the photoconductive layer 5, a film of aluminium, for instance.

The bias D. C. battery voltage could be applied to said layer 18 instead of being applied to a condenser electrode.

In any case, and in accordance with the above-described relation between the displacement of the wall 9 and the periodicity of application of the control light beam 13, which now passes through the condenser electrode 1 and, if established, the layer 18, the operation of the device may be stated as follows: when unlighted, the photocell presents a high impedance and the capacity of the condenser 1—2 charges; when the light beam 13 is sent upon the photocell, the resistance of said cell is suddenly lowered and a discharge current flows through the capacitor, the photocell and the resistor 7 to the ground; a voltage pulse is thus developed across said load resistor 7 and is sent to the conductor 8.

Figure 9:
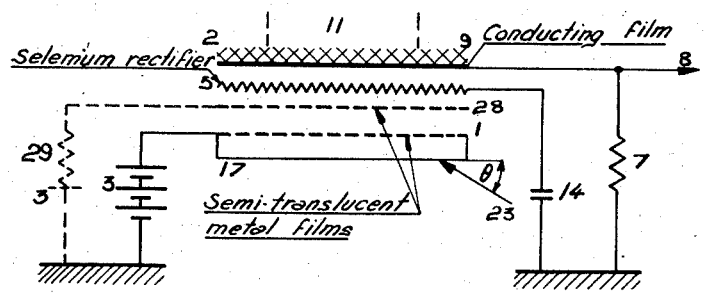
Fig. 9 shows a further alternative embodiment to that shown in Fig. 8.

But, instead of, or in addition to, the provision of a cumulative action obtained by purely electrical means it is also possible to obtain a cumulative action from the light beam itself. The light is taken monochromatic. The arrangement shown in Fig. 9 gives an illustrative embodiment of such an arrangement, the transparent film 18 being replaced by a film 28 which is a semi-translucid one as well as the condenser electrode 1. The impinging light beam 23 makes a fixed angle $\theta$ with respect to the planes of the electrodes.

In such conditions, and for a continuous vibration of the moving wall 9, the distance $d$ between the condenser electrodes then varying at a speed which corresponds to the vibration frequency of said wall 9, optical reflection interferences are produced between the light rays, spaced by $\lambda$, concerned optical wave-length, during the progression of said rays between the reflecting films 1 and 28.

Figure 10A:
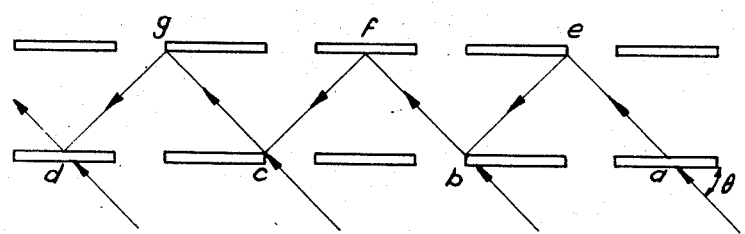
Figs. 10A and 10B shows two diagrams relating to the embodiment shown in Fig. 9.

Considering Fig. 10A, the rays $a$, $b$, $c$, $d$, at an instant of time such that the interelectrode distance equals $$(\lambda/2).\cos \theta$$

or any integer multiple of this value—said light rays add in phase relation and the photocell collects the light flux at a maximum value through the cumulative action of said rays: at point $e$, the light intensity which in the ray I passes through the film 28, at point $f$, the light intensity which in the ray II passes through said film and represents the sum of the intensities from the impinging rays $a$ and $b$, and so on.

Figure 10B:
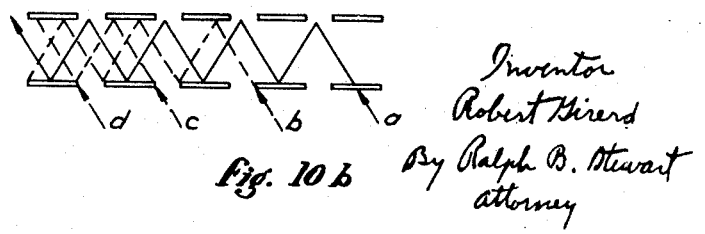

A relative motion of the film 28 affixed to the condenser electrode 2, such as the one indicated in Fig. 10B, for instance, brings the rays in an out of phase relation and additions of light intensities will only occur for very higher orders by which, together with the attenuation due to absorptions, will make the overall light intensity on the photocell quite different from the preceding one, such a departure in light intensity being in direct relation to the interelectrode distance change.

Here again, a reinforcement of the useful action is obtained. Denoting $d$, the distance between electrodes, the condition for obtaining maxima of light intensity is given by the relation:

(3) $\qquad 2d.\cos \theta = 2k.\lambda/2$ and the condition for obtaining minima of light intensity is given by the relation:

(4) $\qquad 2d.\cos \theta = (2k+1).\lambda/2$

When considering the case of very small amplitudes of the vibration of the wall 9 with respect to its mean plane position, it is apparent that important changes in light intensity on the photocell may be obtained since they will reach several wave-lengths.

Naturally, numerous changes may be made in the described devices without departing from the scope of the invention such for instance, as the one indicated by the dot lines in Fig. 9, which comprises the transfer of the battery at the place 3' with the insertion of a guard resistor 29, or else as the one which implicates a polarisation of the light beam ensured before said beam enters the device proper, and so on.

When a plurality of extraneous phenomena are to be concomitantly indicated, applied on a corresponding plurality of pick-up elements, these elements may be grouped for cooperating with a corresponding groupings of devices such as herein above described; the circuit components of said devices may be formed upon a common insulating supporting member and a single discharge light beam may be used for cyclically scanning said devices for a sequential pick-up of the discharge voltages.

I claim:

1. A device for indicating the deviation of a movable wall of a pick-up element from a reference plane position, comprising in combination a first condenser electrode attached to said wall, a second condenser electrode of fixed position in a reference plane, a D. C. voltage supply for one of said condenser electrodes, a photoconductive layer formed on the other of said electrodes, a grounded load resistor connected to said latter electrode through said photoconductive layer, and a control light beam for periodically energising said photoconductive layer to periodically vary the resistance of the connection from said other electrode to ground.

2. A device for indicating the deviation of a movable wall of a pick-up element from a reference plane position, comprising in combination a first condensed electrode attached to said wall, a second condenser electrode of fixed position in a reference plane, a D. C. voltage supply for one of said electrodes, a layer of photoconductive material applied to one of said electrodes, a storage condenser connected from said photoconductive layer to the ground, a load resistor connected from said latter electrode to the ground and a control light beam for periodically energising said photoconductive layer.

3. A device for indicating the deviation of a movable wall of a pick-up element from a reference plane position, comprising in combination a first condenser electrode attached to said wall, a second condenser electrode of fixed position in a reference plane, a D. C. voltage supply for one of said electrodes, the other electrode being divided into two electrically distinct portions, a photoconductive layer formed on the one and the other of said portions of electrode, one of said photoconductive layers being electrically connected to the other portion of electrode, itself connected to a grounded load resistor, the photoconductive layer formed upon said latter portion of electrode being connected to a grounded storage condenser, and a control light beam for periodically energising both of said photoconductive layers.

4. A device for indicating the deviation of a movable wall of a pick-up element from a reference plane position, comprising in combination a first condenser electrode attached to said wall, at least a photoconductive layer on said electrode and a grounded load resistor connected to said electrode, a second condenser electrode formed as a transparent film upon a transparent base plate of fixed position in a reference plane and connected to a battery supply, and a control light beam for periodically energising said photoconductive layer through said translucid second electrode.

5. A device for indicating the deviation of a movable wall of a pick-up element from a reference plane position, comprising in combination a first condenser electrode attached to said wall, at least a photoconductive layer on said first electrode and a semi-translucid film upon said photoconductive layer, a grounded load resistor connected to said first electrode, a second condenser electrode formed as a semi-translucid film upon a transparent base plate of fixed position in a reference plane and connected to a battery supply, and a control light beam of monochromatic light projected at an angle with respect to the plane of said electrode for periodically energising said photoconductive layer through said semi-translucid films.

6. A device for indicating the deviation of a movable wall of a pick-up element from a reference plane position, comprising in combination a first condenser electrode attached to said wall, a second condenser electrode of fixed position in a reference plane, a D. C. voltage supply for one of said condenser electrodes, a photoconductive layer formed on the said second electrode, a grounded load resistor connected to said latter electrode through said photoconductive layer, and a control light beam for periodically energizing said photoconductive layer to periodically vary the resistance of the connection from said other electrode to ground.

7. A device for indicating the deviation of a movable wall of a pick-up element from a reference plane position, comprising in combination a first condenser electrode attached to said wall, a second condenser electrode of fixed position in a reference plane, a D. C. voltage supply for one of said condenser electrodes, a photoconductive layer formed on the said first electrode, said second electrode being transparent, a grounded load resistor connected to said latter electrode through said photoconductive layer, and a control light beam for periodically energizing said photoconductive layer to periodically vary the resistance of the connection from said other electrode to ground.

8. A device for indicating the deviation of a movable wall of a pick-up element from a reference plane position, comprising in combination a first condenser electrode attached to said wall, at least a photoconductive layer on said first electrode and a semi-translucid film upon said photoconductive layer, a grounded load resistor connected to said first electrode, a second condenser electrode formed as a semi-translucid film upon a transparent base plate of fixed position in a reference plane and connected to a battery supply, a control light beam of monochromatic light projected at an angle with respect to the plane of said electrode for periodically energizing said photoconductive layer through said semi-translucid films, and a battery connected through a resistor to said semi-translucid film on said photoelectric layer.

References Cited in the file of this patent

UNITED STATES PATENTS

| | | |
|---|---|---|
| 2,001,096 | Flanders | May 14, 1935 |
| 2,468,687 | Schmitt | Apr. 26, 1949 |
| 2,656,106 | Stabler | Oct. 20, 1953 |

FOREIGN PATENTS

| | | |
|---|---|---|
| 346,437 | Great Britain | Apr. 7, 1931 |